United States Patent Office 3,477,470
Patented Nov. 11, 1969

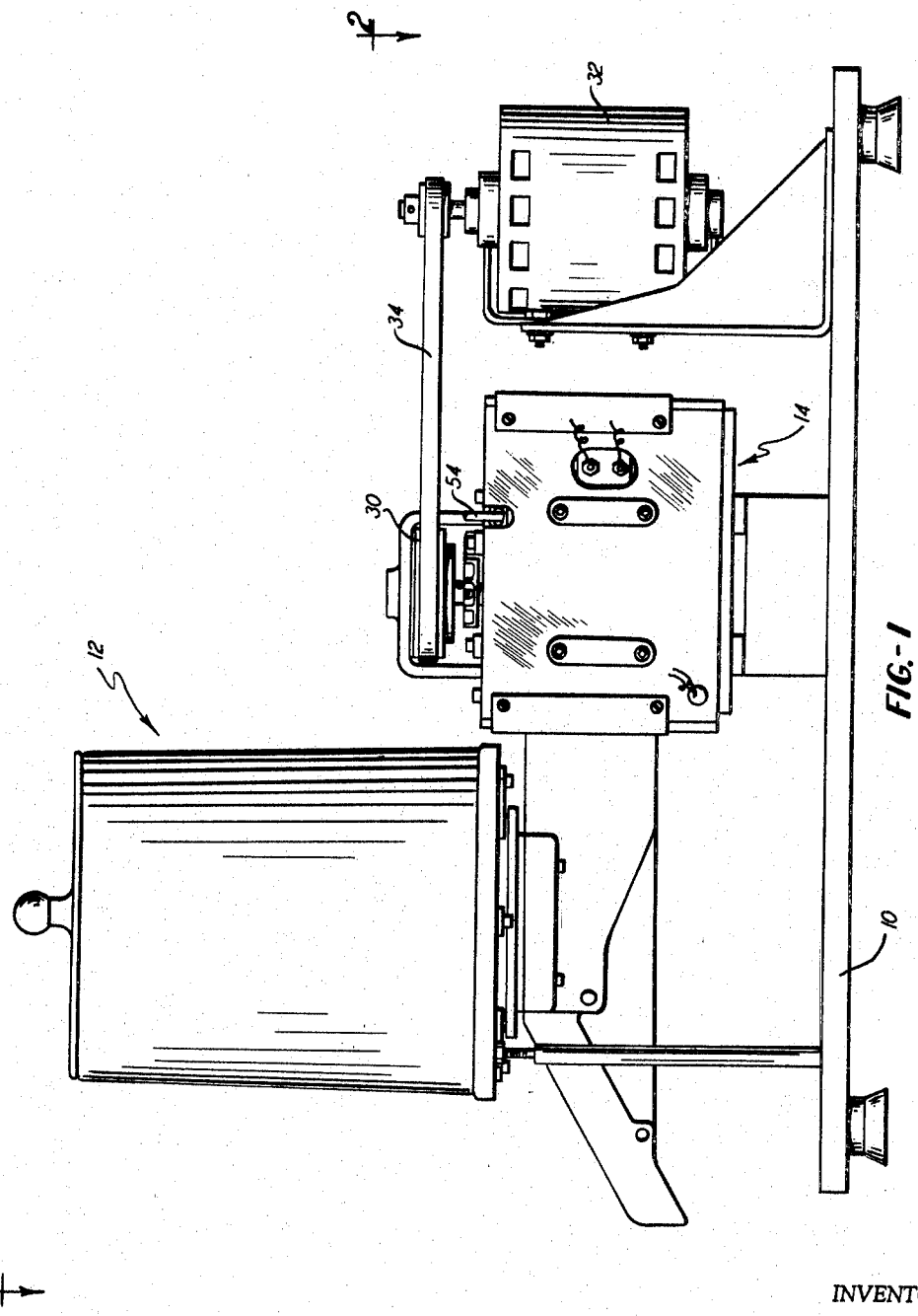

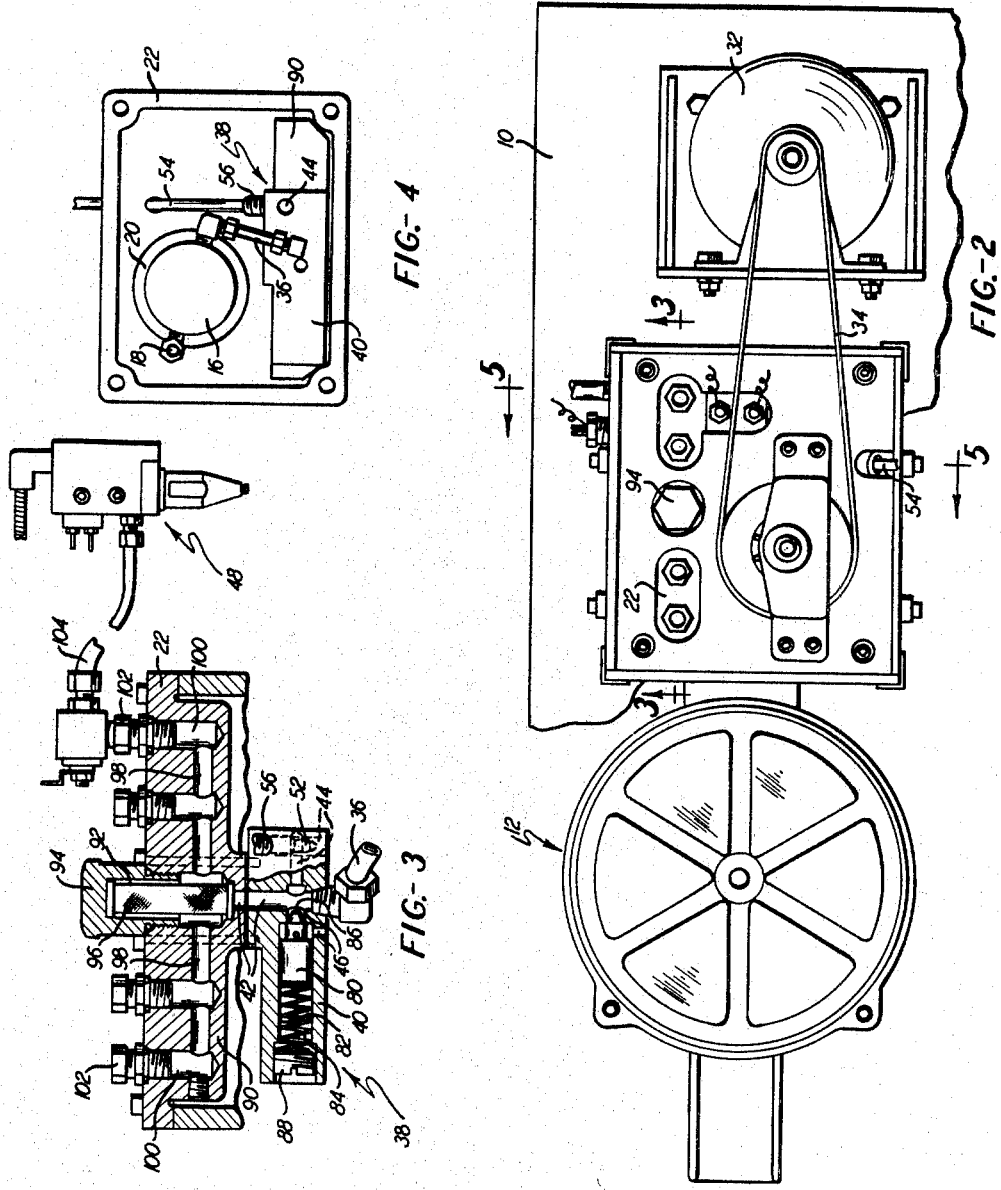

3,477,470
FLUID PRESSURE CONTROL MEANS
Roger S. Estabrooks, North Quincy, Mass., assignor to International Shoe Machine Corporation, Boston, Mass., a corporation of Massachusetts
Original application Mar. 15, 1965, Ser. No. 439,661, now Patent No. 3,332,581, dated July 25, 1967. Divided and this application July 25, 1966, Ser. No. 567,523
Int. Cl. G05d 7/00, 16/02
U.S. Cl. 137—612.1
8 Claims

ABSTRACT OF THE DISCLOSURE

A device for regulating the rate at which fluid may flow through a conduit.

---

Figures 5, 6:
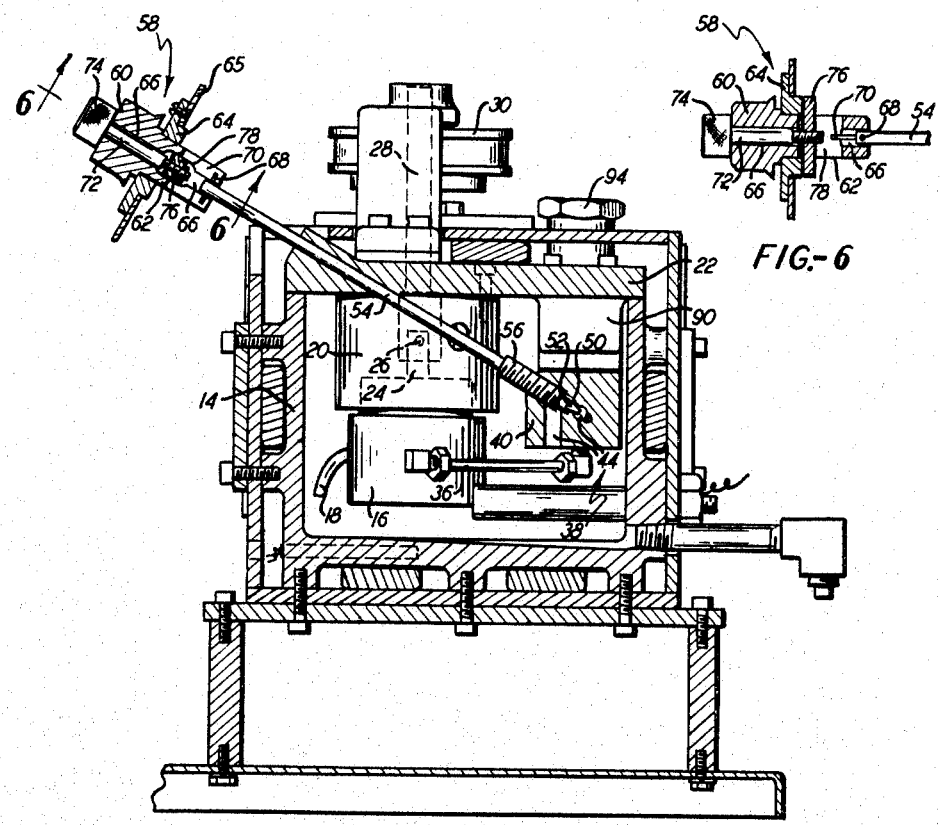

This application is a division of pending United States application Ser. No. 439,661 filed Mar. 15, 1965 now Pat. No. 3,332,581 and relates to an apparatus for metering and dispensing fluid to a workpiece. It is particularly adapted for use with a fluid that is handled at high pressures and temperatures such as thermoplastic adhesive.

An object of this invention is to provide an improved apparatus for dispensing fluid material at a constant pressure. A further object of this invention is to provide an apparatus for maintaining a constant flow rate at the dispensing end of the apparatus. Other objects and advantages of the present invention will become apparent from the following description.

In the operation of this apparatus solid thermoplastic adhesive is loaded into a melting tank where the thermoplastic adhesive is heated and rendered fluid. Means fully disclosed in the aforesaid United States application Ser. No. 439,661 filed Mar. 15, 1965 is provided to cause the molten adhesive to flow into a sump in which is housed a continuously operating gear pump, the inlet of which is immersed in the molten adhesive so as to draw the adhesive through the pump and into a pressure regulating device that is the subject of the instant invention. The pressure regulator consists of a primary conduit leading from the pump outlet to a dispensing gun where the adhesive is dispensed, and two subsidiary conduits each one being in communication with the primary conduit so as to divert and receive a portion of the flow of adhesive from the primary conduit. Each of these subsidiary conduits directs the adhesive flowing therein back to the sump. An obstruction is situated within one of these two subsidiary conduits and means are provided for varying the degree of obstruction.

The amount of static pressure present in the primary and subsidiary conduits can thus be varied by increasing or decreasing the degree of obstruction in said subsidiary conduit. The other subsidiary conduit contains a pressure relief valve which is normally closed thereby preventing flow back to the sump and is designed to open when a predetermined maximum static pressure in the conduits is attained. Means are provided for varying the amount of static pressure necessary to open the pressure relief valve. The portion of adhesive flowing in the primary conduit and not diverted back to the sump then passes through a filter before entering a distribution manifold. A dispensing gun is connected to the distribution manifold by means of a flexible hose so that the adhesive may be dispensed at any point within reach of the hose. The dispensing gun and hose therefor is fully disclosed in the aforesaid United States application Ser. No. 439,661 filed Mar. 15, 1965.

In the accompanying drawings:

FIGURE 1 is a front elevation of the dispensing apparatus in which the instant invention is incorporated;
FIGURE 2 is a plan view of the apparatus as seen from line 2—2 of FIGURE 1;
FIGURE 3 is a sectional view of the pressure and flow regulating device taken along the line 3—3 of FIGURE 2;
FIGURE 4 is a view of the underside of the sump cover illustrating the pressure regulating device mounted thereto;
FIGURE 5 is a side elevation partly in section illustrating the interior of the sump, pressure regulating device and locking knob therefor as seen along the line 5—5 of FIGURE 2; and
FIGURE 6 is a sectional view of the regulating knob taken along the line 6—6 of FIGURE 5.

Referring to FIGURE 1 the entire apparatus is mounted on a platform 10 and includes a heat conductive melting tank 12 and a sump 14 that is in communication with the melting tank 12. A continuously operating gear pump 16 (FIGURE 5) is located within the sump with its inlet port 18 being near the bottom of the sump 14 so as to insure its being immersed in the molten adhesive at all times. The pump 16 is rigidly suspended from a hollow cylindrical pump mount 20 which in turn is rigidly suspended from the sump cover 22. The pump shaft 24 extends upwardly into the hollow pump mount where a joint 26 is made between the pump shaft 24 and an extension shaft 28. A pulley 30 is fixed to the extension shaft and an electric motor 32 or other rotary driving means is connected to the pulley by a chain or belt 34. The molten adhesive is pumped to the pump outlet conduit 36 which directs the flow into the pressure regulating device 38.

Referring to FIGURES 3 and 5 the pressure regulating device 30 consists of a pressure regulating block 40 having a primary conduit 42 and two subsidiary conduits 44 and 46 formed therein, each of these subsidiary conduits being in communication with the primary conduit 42 so as to divert and receive a portion of the flow of molten adhesive from the primary conduit. Both of the subsidiary conduits return the adhesive to the sump 14 whereas the primary conduit directs the adhesive towards the dispensing gun 48.

The first subsidiary conduit 44 consists of a pair of passages, located askew, and interconnected by a tapered orifice 50 (see FIGURES 3 and 5) which acts as a seat for a needle valve 52, the purpose of the needle valve being to obstruct the flow of adhesive in the first subsidiary conduit 44 thereby controlling the pressure and the flow rate therein. This in turn affects the pressure and flow rate of the adhesive in the primary conduit 42. A decrease in the degree of obstruction which the needle valve 52 presents to the orifice 50 in the first subsidiary conduit 44 causes a greater rate of flow of adhesive through the first subsidiary conduit which in turn causes both the pressure and the flow rate in the primary conduit 42 to decrease. The converse is true in that an increase in the degree of obstruction of the orifice 50 results in an increase in the pressure and flow rate of the adhesive in the primary conduit 42.

Variation of the degree of obstruction which the needle valve 52 presents to the orifice 50 is accomplished by means of a rotatable pressure control rod 54, the tip of which forms the needle valve 52 itself. The pressure control rod 54 extends from the exterior of the sump 14, through the sump cover 22 and into the interior of the sump 14 where a threaded portion 56 of the pressure control rod 54 engages a tapped hole in the pressure regulating block 40. The location of the tapped hole is such that the longitudinal axis of the pressure control rod 54 and the central axis of the orifice 50 coincide thereby insuring that the tip of the pressure control rod 54 which forms the needle valve 52 and the portion of the orifice 50 which forms the valve seat will be in alignment.

In operation, as the pressure control rod 54 is rotated, an axial motion is simultaneously imparted to the control rod 54 by reason of its threaded engagement with the pressure regulating block 40 thereby increasing or decreasing the degree of obstruction which the needle valve 52 presents to the orifice 50 depending on the direction of rotation of the pressure control rod.

Rotation of the pressure control rod 54 is facilitated by a regulating knob 58 (see FIGURES 5 and 6) having a head portion 60 and a shank portion 62 the head portion 60 being of a greater diameter than the shank portion 62. The regulating knob 58 is mounted in a support bushing 64 so that the shank portion 62 is free to rotate therein. The support bushing 64 may be rigidly mounted to a control panel 65. A centrally located internal bore 66 extends through the entire length of the regulating knob 58. The portion of the internal bore which is located in the shank portion 62 of the regulating knob 58 loosely accommodates the outer extremity of the pressure control rod 54 thereby allowing axial movement of the rod 54 within the bore 66. Rotary motion is transmitted from the regulating knob 58 to the pressure control rod 54 by means of a pin 68 secured to the outer extremity of the pressure control rod 54 and extending diametrally into a longitudinal slot 70 cut along the diameter of the shank portion 62 of the regulating knob 58.

Once the setting of the pressure control rod 54 has been fixed it becomes desirable to maintain this setting and with this end in view a locking mechanism is made an integral part of the regulating knob. The portion of the internal bore 66 which is located in the head portion 60 of the regulating knob 58 loosely accommodates a locking shaft 72, the outer extremity of which is rigidly attached to a lock shaft knob 74 with the inner extremity extending to the shank portion 62 of the regulating knob 58 and threads being formed at the inner extremity. A rectangular locking bar 76 is slidably mounted in an oval-shaped slot 78 located in the shank portion of the regulating knob, the longitudinal axis of the locking bar 76 being perpendicular to the longitudinal axis of the regulating knob 58 with the ends of the locking bar 76 protruding beyond the periphery of the shank portion 62 of the regulating knob. A tapped hole is centrally positioned in the locking bar 76 and thereby engages the threaded portion of the locking shaft 72 so that as the locking shaft is rotated an axial motion is imparted to the locking bar 76 thereby drawing the protruding ends of the locking bar 76 against the rigidly fastened support bushing 64 and preventing rotary motion of the regulating knob 58.

Referring to FIGURE 3, obstructing the second subsidiary conduit 46 is a spring-biased plunger 80 slidably contained in an internal bore 82. A helical compression spring 84 contained in the internal bore 82 maintains the plunger 80 in a position which fully obstructs the second subsidiary conduit 46. A reactor surface 86 of the plunger is in communication with the adhesive so that the plunger will retract from its obstructing position when the force on the reactor surface 86 exceeds the force asserted by the spring 84. The force needed to compress the spring 84 may be varied by means of a plug 88 which is threaded into the other end of the bore 82. Thus the mechanism acts as a relief valve, the purpose of which is to limit the maximum pressure in the system, thereby preventing leakage or rupture at location throughout the apparatus subject to relatively high stresses.

The pressure regulating block 40 is rigidly mounted to the underside of a distribution manifold 90, the manifold 90 being an integral part of the sump cover 22. A continuation of the primary conduit is located in the underside of the distribution manifold 90. Directly above and in communcation with the primary conduit is a relatively large diameter bore 92 hereinafter referred to as the filter chamber which extends upwardly from the termination of the primary conduit 42 through the outer surface of the sump cover 22. A cup-shaped filter cap 94 is mounted in an inverted position on the sump cover 22 above and concentric with the filter chamber 92 thereby enclosing the chamber. Disposed within the filter chamber 92 and concentric therewith is a hollow cylindrical filter 96 the upper end of which abuts the ceiling of the interior of the filter cap 94 and the lower end of which abuts the filter chamber 92 so that the adhesive may flow from the primary conduit 42 to the interior of the filter 96. The filter cap 94 is mounted on the sump cover by threaded engagement therewith thereby permitting th filter 96 to be compressed between the filter cap 94 and the bottom of the filter chamber 92 so as to insure a tight seal at its ends. The filter is easily accessible for cleaning or replacement purposes.

The portion of adhesive that is no returned to the sump 14 via the subsidiary conduits 44 and 46 and hence remains in the primary conduit 42 flows into the interior of the filter 96, passes through the filter to the filter chamber 92 wherefrom it enters a distribution conduit 98. The distribution conduit is essentially an internal bore running longitudinally within the distribution manifold 90 and intersecting the filter chamber 92 so as to receive the flow of adhesive from the filter chamber 92. A plurality of passages 100 extend upwardly from the distribution conduit 98 through the upper surface of the sump cover 22 at which point fittings 102 connect each of said passages to a flexible heated hose 104 which directs the adhesive to the applicator nozzle 48, reference herein being made to the application Ser. No. 439,661 filed Mar. 15, 1965 for a full disclosure thereof.

Summarizing the operation of the apparatus, the fluid to be dispensed is pumped into the primary conduit 42 by means of the continuously operating pump 16 wherefrom the fluid is directed by means of the passageways formed in the distribution manifold 90 to the nozzle assembly 48 which is located at the desired point of distribution of the fluid. The obstruction that the needle valve 52 presents to the first subsidiary conduit 44 is adjusted to regulate the rate of flow of the fluid through the first subsidiary conduit 44 and back to the sump 14 which in turn regulates the pressure of the fluid within the primary conduit 42 and at the nozzle assembly 48. Thus when the nozzle assembly 48 is actuated so as to be in an open and dispensing configuration the fluid dispensed therethrough may be at a constant pressure and flow rate. Should it be desirable to further insure that the pressure of the fluid never exceeds a predetermined maximum value the plug 88 may be rotated so as to adjust the force with which the spring 84 urges the plunger 80 into an obstructing relationship with the second subsidiary conduit 46 so that when the fluid pressure in the primary conduit reaches the aforesaid predetermined maximum value the force of the spring 84 may be overcome thereby to effect a withdrawal of the plunger 80 from its normally obstructing position and thereby permitting a portion of the fluid to flow through the second subsidiary conduit 46 and return to the sump 14.

I claim:

1. A pressure and flow regulating device for use in a fluid system comprising:

a block;

a primary conduit, extending through the block, having an inlet end and an outlet end;

a first subsidiary conduit, in the block, intersecting the primary conduit at one end and intersecting the periphery of the block at its other end so that it is exposed to atmosphere at said other end;

an obstruction located within the first subsidiary conduit intermediate its ends for blocking the flow of fluid therethrough;

means for adjusting the obstruction within the first subsidiary conduit to thereby vary the degree of blocking of said fluid flow so as to vary the rate at which fluid may flow through the first subsidiary conduit;

a second subsidiary conduit intersecting the primary conduit;

pressure relieving means located within the second subsidiary conduit; and means for introducing fluid into the inlet end of the primary conduit.

2. The device as defined in claim 1 wherein the first subsidiary conduit is formed of a pair of non-intersecting bores interconnected by a third bore; and wherein the obstruction comprises a rotatable rod threadedly engaged with the block and having a tip located interiorly of the block on a longitudinal axis that coincides with the axis of the third bore, the tip being of a shape conforming to the shape of the third bore.

3. The device as recited in claim 2 further comprising:

a rigid support member;

a regulating knob rotatably mounted within said rigid support member, said knob being coaxial with said rod and having a longitudinal bore for loose accommodation of the end of said rod located exteriorly of said block and a diametral slot extending longitudinally through said knob and intersecting said longitudinal bore;

a pin secured to the end of said rod which is loosely accommodate by said knob, said pin projecting diametrally from said rod into the diametral slot of said knob so that said longitudinal bore and said diametral slot may cooperate with said rod and said pin as to allow rotary motion to be transmitted from said knob to said rod by means of contact between said pin and the surface of said diametral slot and to allow axial movement of said rod and said pin within said longitudinal bore and said diametral slot.

4. The device as recited in claim 3 further comprising: means for locking said regulating knob in a fixed position.

5. The device as recited in claim 4 wherein said locking means comprises:

a shoulder member located at the periphery of said regulating knob and being so constructed and arranged that said shoulder member may abut said rigid support member;

a locking shaft loosely contained within that portion of the longitudinal bore of said regulating knob not occupied by said rod, said locking shaft having a locking knob affixed thereto at its outer extremity and a threaded portion formed at its inner extremity;

a locking bar slidably mounted within a slot formed in said regulating knob, the ends of said locking bar protruding beyond the periphery of said regulating knob, whereby said locking bar may slide in the direction of the longitudinal axis of said regulating knob;

said locking bar having a tapped hole centrally located therein for engagement with the threaded portion of said locking shaft whereby rotation of said locking shaft will impart translatory motion to said locking bar in the direction of the longitudinal axis of said regulating knob, thereby drawing said locking bar and said shoulder member together so that said locking bar and said shoulder member may become clamped to said rigid support member thereby preventing movement of said regulating knob.

6. A device for positioning a member having a rod at one end comprising:

a rigid support member;

a regulating knob rotatably mounted within said rigid support member and having a shoulder located at its periphery said shoulder being in an abutting relation with said support member, a centrally located longitudinal bore for accommodation of one end of said rod and a diametral slot extending longitudinally through said regulating knob and intersecting said longitudinal bore;

a pin secured to the tip of and projecting diametrally from said rod into said diametral slot whereby a rotary motion may be transmitted from said regulating knob to said rod by means of contact between said pin and the surface of said slot, and whereby axial movement of said rod is permitted with respect to said regulating knob;

a locking shaft loosely contained within that portion of the longitudinal bore of said regulating knob not occupied by said rod, said locking shaft having a locking knob affixed thereto at its outer extremity and a threaded portion formed at its inner extremity;

and a locking bar slidably mounted within a slot formed in said regulating knob, the ends of said locking bar protruding beyond the periphery of said regulating knob;

said locking bar having a tapped hole centrally located therein for engagement with the threaded portion of said locking shaft whereby rotation of said locking shaft will impart translatory motion to said locking bar in the direction of the longitudinal axis of said regulating knob, thereby drawing said locking bar and the shoulder of said regulating knob together so that they may become clamped to said rigid support member, thereby preventing movement of said regulating knob.

7. A pressure and flow regulating device for use in a fluid system comprising:

a primary conduit having an inlet end and an outlet end;

a first subsidiary conduit intersecting the primary conduit at one end and exposed to atmosphere at its other end;

an obstruction located within the first subsidiary conduit intermediate its ends for blocking the flow of fluid therethrough;

means for adjusting the obstruction within the first subsidiary conduit to thereby vary the degree of blocking of said fluid flow so as to vary the rate at which fluid may flow through the first subsidiary conduit;

a second subsidiary conduit intersecting the primary conduit;

pressure relieving means located within the second subsidiary conduit; and means for introducing fluid into the inlet end of the primary conduit.

8. A device for adjustably positioning a rod in a block and for locking the rod in adjusted position comprising:

a support member;

a knob, rotatably mounted in the support member, having a surface in abutment with one side of the support member;

a locking bar, located on the other side of the support member, mounted to the knob for movement toward and away from the support member;

means for effecting movement of the locking bar toward and away from the support member;

means mounting one end of the rod to the knob for rotation in unison with the rod and for axial movement with respect to the knob; and means receiving the other end of the rod in the block for longitudinal movement in the block.

References Cited

UNITED STATES PATENTS

| | | | |
|---|---|---|---|
| 2,599,063 | 6/1952 | Miller | 137—595 XR |
| 1,230,499 | 6/1917 | Matheson | 251—270 XR |
| 1,266,937 | 5/1918 | Haselwander | 251—105 |
| 1,360,340 | 11/1920 | Wetzler | 251—266 XR |
| 1,732,109 | 10/1929 | Phelps et al. | 137—595 XR |
| 1,795,839 | 3/1931 | Credle | 251—266 XR |
| 3,080,185 | 3/1963 | Walker | 74—504 XR |
| 3,184,214 | 5/1965 | King | 251—270 XR |
| 3,207,179 | 9/1965 | Klaques | 137—612.1 |
| 3,342,451 | 9/1967 | Matousek | 251—77 |

FOREIGN PATENTS

| | | |
|---|---|---|
| 128,427 | 7/1948 | Australia. |
| 208,977 | 4/1909 | Germany. |

SAMUEL SCOTT, Primary Examiner

U.S. Cl. X.R.

251—105